(12) United States Patent
Hsieh

(10) Patent No.: US 6,698,698 B1
(45) Date of Patent: Mar. 2, 2004

(54) TELESCOPIC TUBE

(76) Inventor: Wu-Hong Hsieh, No. 162, Chung Shan 2$^{nd}$ Rd., Lu Chou City, Taipei Hsien (TW)

( * ) Notice: Subject to any disclaimer, the term of this patent is extended or adjusted under 35 U.S.C. 154(b) by 74 days.

(21) Appl. No.: 10/327,083

(22) Filed: Dec. 24, 2002

(51) Int. Cl.$^7$ ................................................. F16M 11/00
(52) U.S. Cl. ....................... 248/125.8; 84/453; 248/161
(58) Field of Search .................................. 248/161, 404, 248/407, 408, 409, 157, 443, 125.8; 84/453

(56) References Cited

U.S. PATENT DOCUMENTS

| | | | | |
|---|---|---|---|---|
| 4,596,484 A | * | 6/1986 | Nakatani | 403/104 |
| 4,671,479 A | * | 6/1987 | Johnson et al. | 248/173 |
| 6,209,829 B1 | * | 4/2001 | Yu | 248/122.1 |
| 6,412,737 B1 | * | 7/2002 | Minagawa | 248/166 |

* cited by examiner

Primary Examiner—Ramon O. Ramirez
(74) Attorney, Agent, or Firm—Bacon & Thomas, PLLC

(57) ABSTRACT

A telescopic tube has an outer tube having a notched post securely mounted inside the outer tube, an inner tube selectively and movably received in the outer tube, a seat securely connected to a distal end of the inner tube and having a spring extendably received in the seat and a connector detachably connected to a distal end of the seat to adapt to connect to a musical device, a handle pivotally connected to the seat to force the spring to extend, and a securing device securely connected to a distal end of the spring and being movable relative to the inner tube to selectively clamp the notched post. A relative position of the inner tube to the outer tube is able to be adjusted by the pivotal movement of the handle.

18 Claims, 5 Drawing Sheets

TELESCOPIC TUBE

BACKGROUND OF THE INVENTION

1. Field of the Invention

The present invention relates to a telescopic tube, and more particularly to a telescopic tube having an outer tube, an inner tube movably received in the outer tube and a handle pivotally connected to the inner tube to control activation of a clamping mechanism applied to a notched post in the outer tube such that relative position between the inner tube and the outer tube is changeable.

2. Description of Related Art

A telescopic tube mechanism normally is applied to a stand and aimed to adjust the height of the stand to match the height of the user. A conventional telescopic tube mechanism has a first tube and a second tube. A connector is provided between the first tube and the second tube. When adjustment of the height of the telescopic tube is required, the operator first unscrews the connector to release the engagement between the first tube and the second tube. Then the operator extends or retracts the second tube relative to the first tube. After the height of the telescopic tube is changed, the operator screws the connector to secure the relative position between the first tube and the second tube.

The entire process of unscrewing and screwing the connector to change the height of the telescopic tube is quite troublesome. U.S. Pat. No. 4,671,479 discloses an inventive telescopic tube mechanism having an outer tube and an inner tube movably received in the outer tube. A handle is provided on a top portion of the inner tube to activate a spring so that a conical head of an inner sleeve received in the inner tube is able to be released from limit of the outer tube. When the inner sleeve is released, pulling the inner tube is possible to change the relative position between the inner tube and the outer tube. However, because the limit of the outer tube to the inner sleeve is based on the friction between the inner surface of the outer tube and the inner sleeve, after a long period of time changing the relative position between the inner tube and the outer tube, the grip to the inner sleeve is worn and thus positioning effect between the inner tube and the outer tube is diminished. Furthermore, rotation between the inner tube and the outer tube happens, which is quite annoying to the operator.

To overcome the shortcomings, the present invention tends to provide an improved telescopic mechanism to mitigate and obviate the aforementioned problems.

SUMMARY OF THE INVENTION

The primary objective of the present invention is to provide an improved telescopic tube of which the height of the tube can be changed easily by operating a handle pivotally engaged with a seat.

Another objective of the present invention is to provide an improved securing device inside the telescopic tube such that when the handle is operated, a pair of clamping claws of the securing device is able to release a notched post inside the outer tube so that the height of the telescopic tube can be changed.

Other objects, advantages and novel features of the invention will become more apparent from the following detailed description when taken in conjunction with the accompanying drawings.

DETAILED DESCRIPTION OF THE PREFERRED EMBODIMENT

Figure 1:
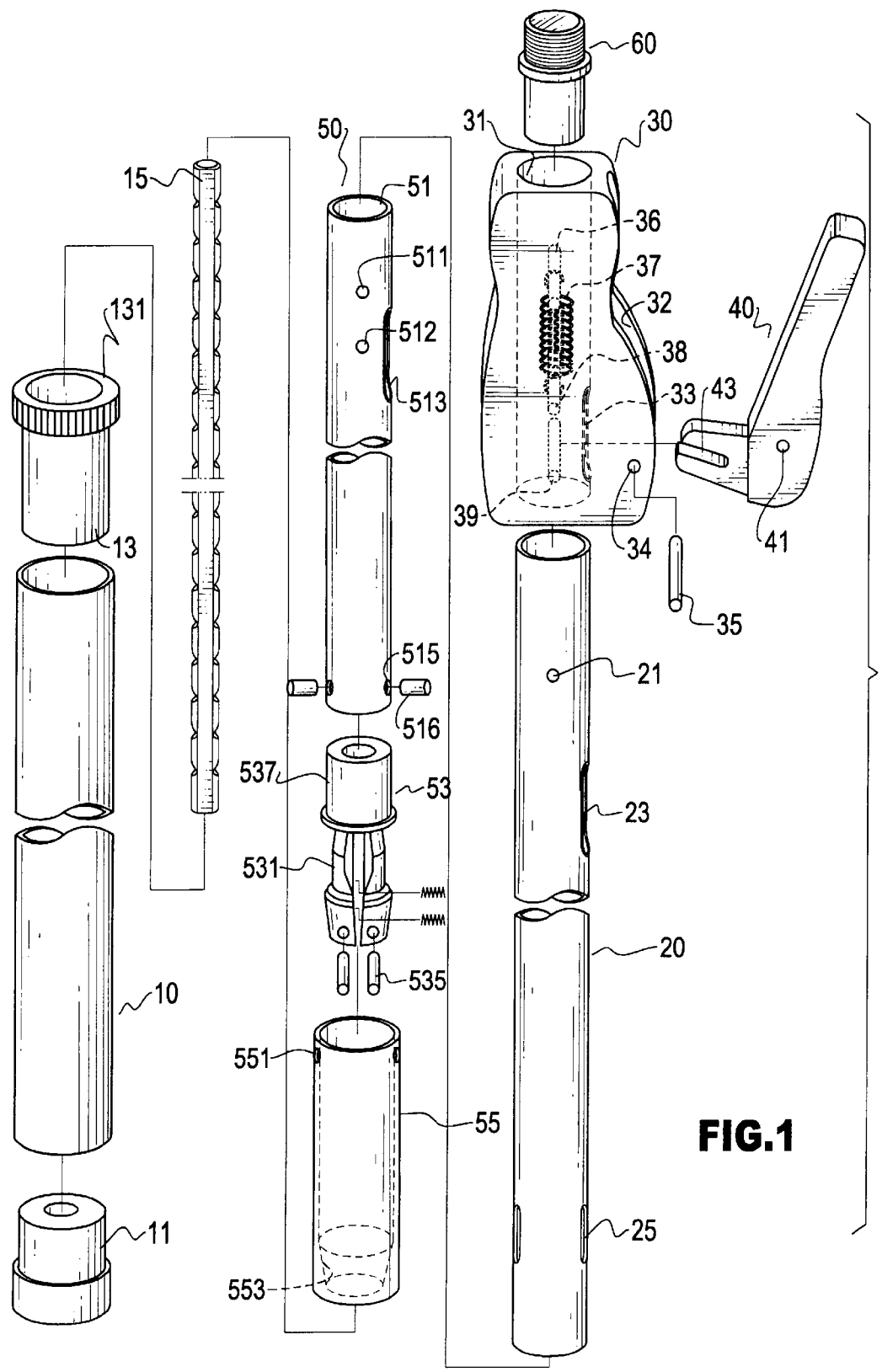
FIG. 1 is an exploded perspective view of the telescopic tube of the present invention.

With reference to FIG. 1, the telescopic tube in accordance with the present invention has an outer tube (10), an inner tube (20), a seat (30), a handle (40) and a securing device (50).

The outer tube (10) has two open ends with a plug (11) securely received in one of the open ends, a sleeve (13) mounted in the other open end of the outer tube (10) and having a flange (131) formed on a free end of the sleeve (13), and a notched post (15) securely received in the outer tube (10) and having a distal end securely connected to the plug (11).

The inner tube (20) has a first pin hole (21), an operation hole (23) and a limiting hole (25) respectively defined in an upper portion, a mediate portion and a lower portion of the inner tube (20). The limiting hole (25) is a long hole.

The seat (30) has a centrally defined through hole (31) to correspond to a free end of the inner tube (20), a cutout (32) defined in a side face of the seat (30) to correspond to the handle (40), an opening (33) defined in a bottom face defining the cutout (32) to correspond to the operation hole (23) of the inner tube (20) and a second pin hole (34) defined through side faces of the cutout (32) to receive a first pin (35). A second pin (36) laterally extends in the seat (30) to securely connect to a first distal end of a spring (37) and to extend through the first pin hole (21) of the inner tube (20). A third pin (38) securely connects to a second distal end of the spring (37). A fourth pin (39) is securely mounted inside the seat (30).

The handle (40) includes a third pin hole (41) corresponding to the second pin hole (34) and a slit (43) corresponding to the fourth pin (39).

The securing device (50) includes an actuating tube (51), a retainer (53) and an inner sleeve (55).

The actuating tube (51) has a fourth pin hole (511) to correspond to the third pin (38), an elongate hole (513) corresponding to the operation hole (23) of the inner tube (20) and the opening (33) of the seat (30), and a fifth pin hole (515) defined to receive therein a pair of fifth pins (516).

Figure 3:
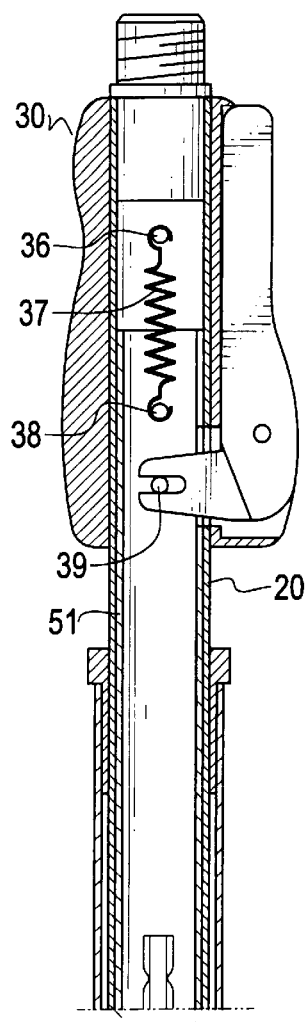
FIG. 3 is a schematic view showing the movement of the inner tube by the activation of the handle.
Figure 3:
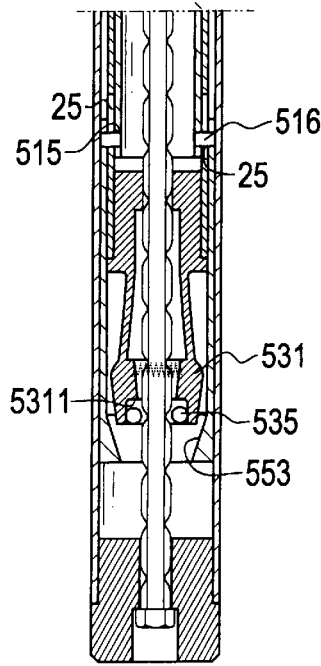

The retainer (53) has two clamping claws (531) respectively separated from each other by two urging springs (533) and two retaining bars (535) respectively extending into one of the two clamping claws (531). It is noted that each clamping claw (531) has a cutout (5311) (as shown in FIG. 3) such that when one of the retaining bars (535) extends into the corresponding clamping claw (531), a portion of the retaining bar (535) is exposed outside of the clamping claw (531).

The inner sleeve (55) has a sixth pin hole (551) corresponding to the fifth pin hole (515) of the actuating tube (51) and a conical head (553) formed on an inner surface of one side of the inner sleeve (55).

Figure 2:
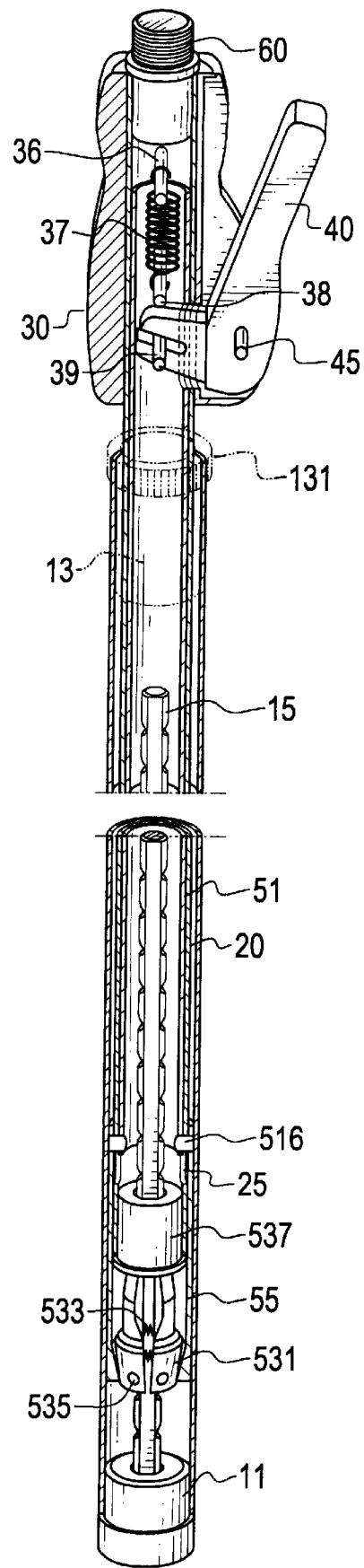
FIG. 2 is a schematic view of the assembled telescopic tube of the present invention with a portion in cross section.

With reference to FIG. 2 and still taking FIG. 1 for reference, when the telescopic tube of the present invention is in assembly, the retainer (53) is received in the inner sleeve (55) with the clamping claws (531) received in the conical head (553). Because the diameter of the conical head (553) is tapered, the clamping claws (531) are forced to move towards each other, which results in that the two urging springs (533) are compressed. The actuating tube (51) is received in the inner tube (20) and the inner sleeve (55) is then mounted outside the inner tube (20) with the sixth pin hole (551) aligned with the limiting hole (25) and the fifth pin hole (515). Then the two fifth pins (516) are inserted into the aligned fifth pin hole (515), the limiting hole (25) and the sixth pin hole (551) to securely combine the inner tube (20), the actuating tube (51) and the inner sleeve (55). It is to be noted that the retainer (53) has a head (537) corresponding to one of the open ends of the inner tube (20). After the combination of the inner tube (20), the actuating tube (51) and the inner sleeve (55), the head (537) of the retainer (53) is securely received in the inner tube (20), thus, the retainer (53) is securely but movably received in the inner sleeve (55).

The inner tube (20) is inserted into the through hole (31) of the seat (30) with the opening (33) aligned with the operation hole (23) and the elongate hole (513). The second pin (36) inside the seat (30) is then extending into the first pin hole (21). The handle (40) is inserted into the cutout (32) of the seat (30) with the second pin hole (34) aligned with the third pin hole (41). Therefore, the first pin (35) is inserted into the aligned second pin hole (34) and the third pin hole (41) to allow the handle (40) to pivot relative to the seat (30). After the handle (40) is pivotally connected to the seat (30), the slit (43) communicates with the opening (33), the operation hole (23) of the inner tube (20) and the elongate hole (513) of the actuating tube (51) and has the fourth pin (39) received in the slit (43). A connector (60) is inserted into the through hole (31) for connecting to a musical device, such as a music note stand etc.

After combining the inner tube (20), the seat (30), the handle (40) and the securing device (50), the combination is inserted into the outer tube (10), which is shown in FIG. 2.

With reference to FIG. 3, when the handle (40) is pressed toward the seat (30), the fourth pin (39) extending through an aperture (512) in the actuating tube (51) is forced by the handle (40) to move, which drives the inner sleeve (55) to move accordingly. However, because the inner sleeve (55) is securely connected to the actuating tube (51) by the fifth pins (516) which are movable in the limiting hole (25) of the inner tube (20), the movement of the inner sleeve (55) releases the limit of the conical head (553) to the clamping claws (531). After the clamping claws (531) are released from the conical head (553), the two urging springs (533) push the two clamping claws (531) apart from each other. Thereafter, because the clamping claws (531) are apart from each other, the two retaining bars (535) disengage with the notched post (15) and thus the user is able to hold the handle (40) together with the seat (30) and the inner tube (20) to freely move relative to the outer tube (10). The movement of the inner tube (20) relative to the outer tube (10) allows the adjustment of the height of the telescopic tube of the present invention.

Figure 4:
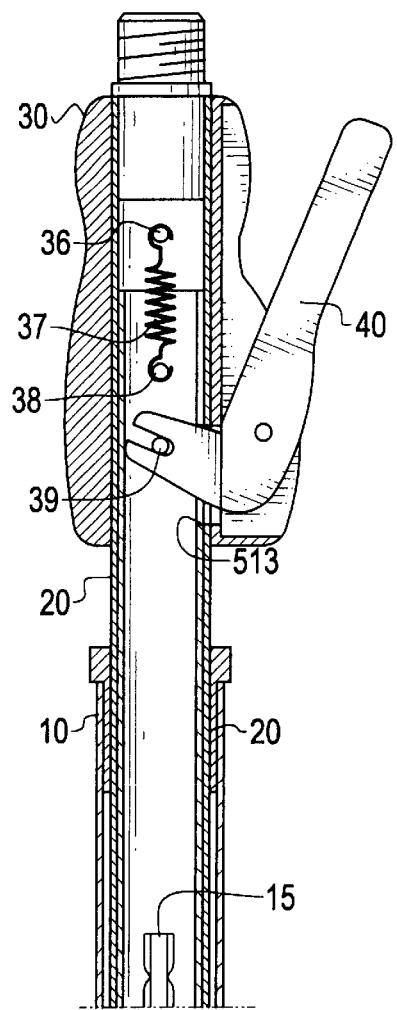
FIG. 4 is a schematic view showing that after the handle returns to its original position, the conical portion of the clamping claw is again limited by a sleeve which is securely connected to the inner tube and thus the clamping claw clamps the notched post to secure the relative position of the inner tube to the outer tube.
Figure 4:
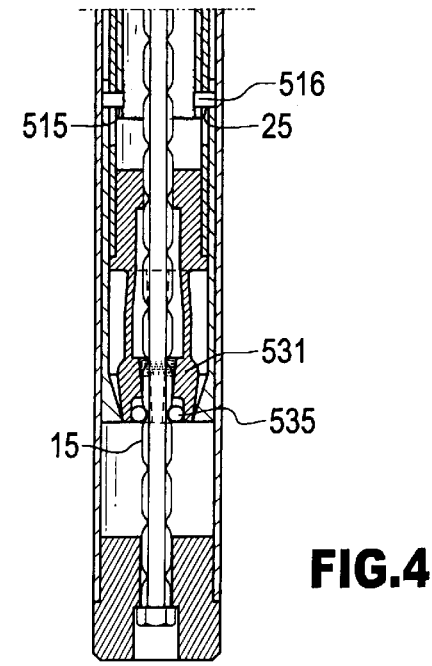

With reference to FIG. 4, when the user releases the handle (40), the spring (37) pulls the actuating tube (51) toward the seat (30), which also drives the inner sleeve (55) to move relative to the inner tube (20). The movement of the inner sleeve (55) toward the inner tube (20) makes the clamping claws (531) to be received in the conical head (553) again, which forces the two clamping claws (531) to move toward each other. The movement of the two clamping claws (531) toward each other allows the two retaining bars (535) to securely clamp the notched post (15). Thus the adjustment of the height of the telescopic tube is completed.

Figure 5:
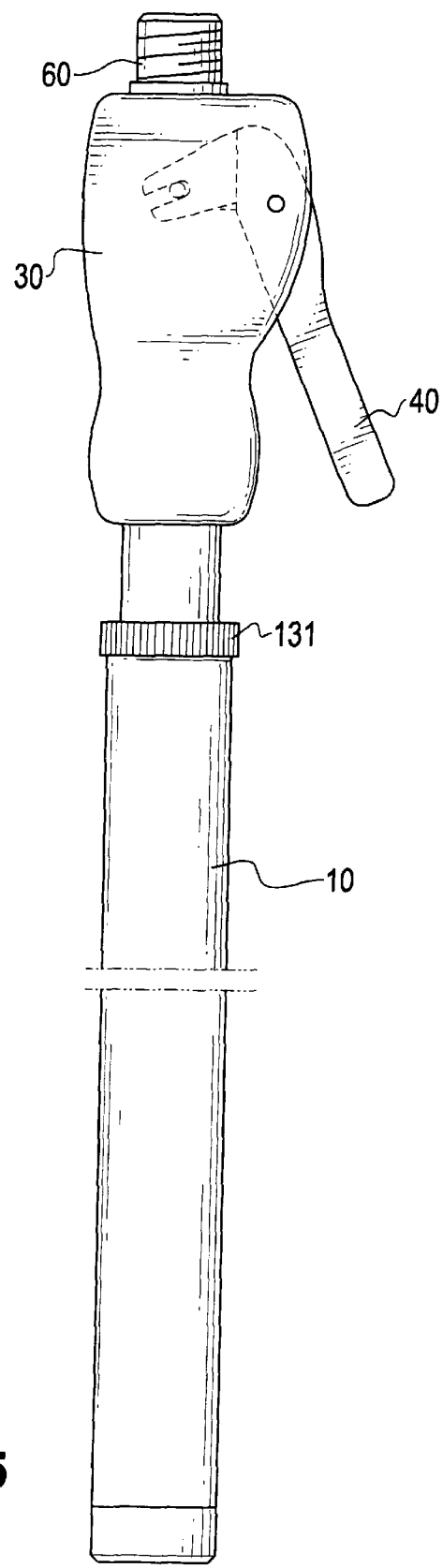
FIG. 5 is a plan view showing another embodiment of the present invention, wherein the handle may be mounted on the seat with an angle different to that shown in the first embodiment.

With reference to FIG. 5, it is noted that even when the orientation of the handle (40) is different to that as shown in the first preferred embodiment, the telescopic tube of the present invention can still function successfully.

Figure 6:
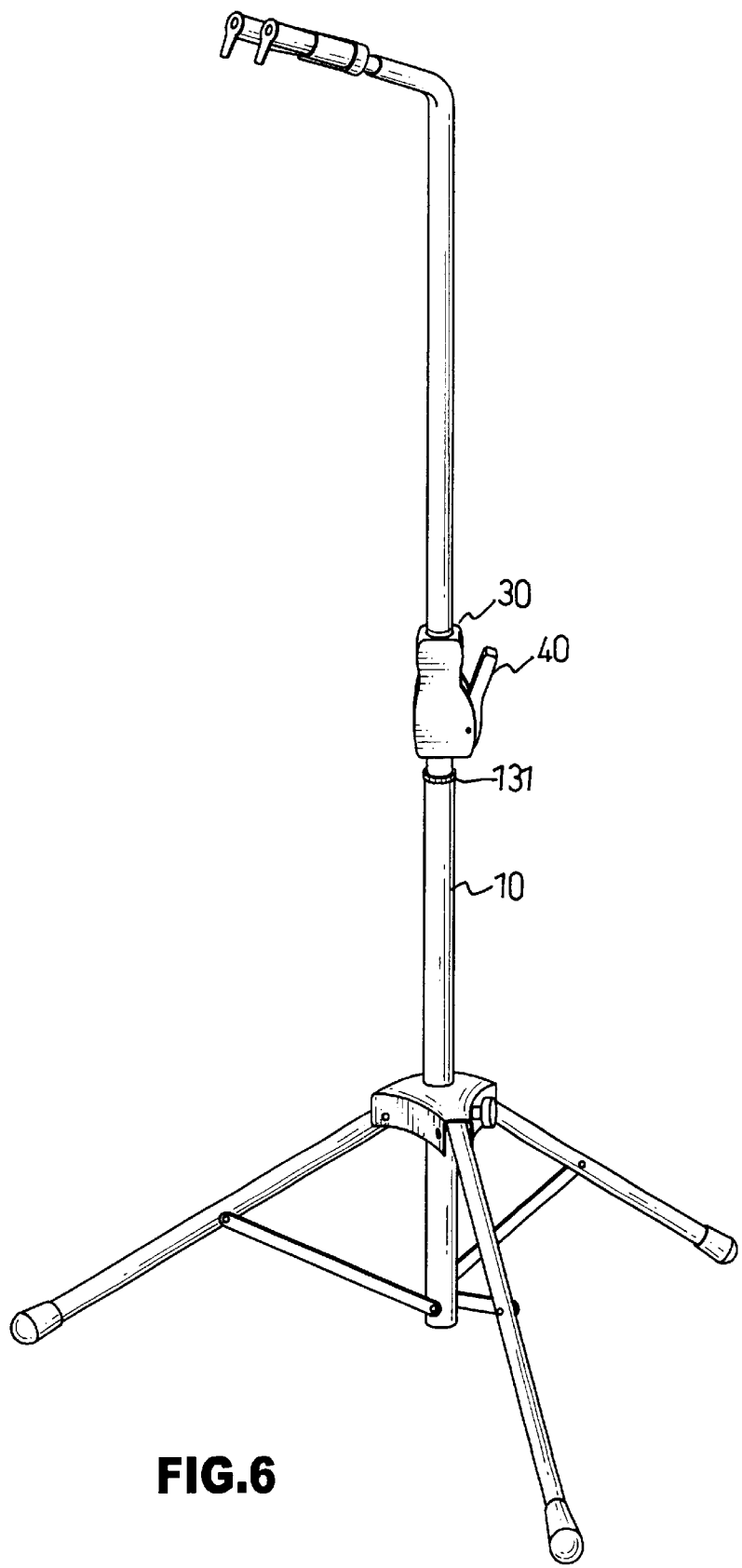
FIG. 6 is a schematic view showing that the telescopic tube of the present invention is applied to a stand which is ready to hold a musical instrument.

With reference to FIG. 6, it is noted that the telescopic tube of the present invention may also be applied to a stand to be ready to hold a musical instrument, wherein the connector (60) may be replaced with a tube so that the musical instrument, such as a guitar is able to be held by the retainer on a free end of the tube.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A telescopic tube comprising:
    an outer tube having a notched post securely mounted inside the outer tube;
    an inner tube selectively and movably received in the outer tube;
    a seat securely connected to a distal end of the inner tube and having a spring extendably received in the seat and a connector detachably connected to a distal end of the seat to adapt to connect to a musical device;
    a handle pivotally connected to the seat to force the spring to extend; and
    a securing device securely connected to a distal end of the spring and being movable relative to the inner tube to selectively clamp the notched post such that relative position of the inner tube to the outer tube is adjusted by the pivotal movement of the handle.

2. The telescopic tube as claimed in claim 1, wherein the seat has an opening, the inner tube has an operation hole aligned with the opening and the securing device has an actuating tube provided with a elongated hole aligned with the operation hole so that the handle is able to extend through the aligned opening, the operation hole and the elongated hole to control movement of the actuating tube.

3. The telescopic tube as claimed in claim 2, wherein the inner tube has a first pin hole and the seat has a second pin hole to align with a third pin hole in the handle, such that a first pin is able to extend through the aligned second pin hole and the third pin hole to allow the handle to pivot relative to the seat.

4. The telescopic tube as claimed in claim 3, wherein a second pin is securely received in the seat to connect to a first distal end of the spring and extend into the first pin hole so as to firmly position the inner tube in the seat.

5. The telescopic tube as claimed in claim 4, wherein the securing device actuating tube has a fourth pin hole to allow extension of a fourth pin is movably received in the seat and in a slit in the handle thereby allowing the pivotal movement of the handle to drive the actuating tube to move.

6. The telescopic tube as claimed in claim 1, wherein the securing device has an actuating tube movably received in the inner tube, a retainer with a head securely received in a distal end of the inner tube and an inner sleeve movably mounted outside the inner tube and securely connected to the actuating tube.

7. The telescopic tube as claimed in claim 6, wherein the inner tube has an elongated limiting hole and the actuating tube has a pin hole to allow a pair of pins to extend through the pin hole and into the limiting hole so that the pivotal movement of the handle is able to drive the inner sleeve to move relative to the inner tube.

8. The telescopic tube as claimed in claim 7, wherein the retainer further has a pair of clamping claws movable with respect to each other and each having therein a retaining bar such that the retaining bars of the pair of clamping claws are able to clamp the notched post when the pair of clamping claws are moved toward each other, and wherein the securing device further has two urging springs sandwiched between the pair of clamping claws to push the clamping claws away from each other.

9. The telescopic tube as claimed in claim 8, wherein the retainer is movable relative to the inner sleeve and the inner sleeve has a conical head formed inside the inner sleeve to selectively receive therein the pair of clamping claws so that when the pair of clamping claws are received in the conical head of the inner sleeve, the pair of clamping claws are forced to clamp the notched post and to secure a relative position of the inner tube to the outer tube.

10. A telescopic tube comprising:

an outer tube having a notched post securely mounted inside the outer tube;

an inner tube selectively and movably received in the outer tube;

a seat securely connected to a distal end of the inner tube and having a spring extendably received in the seat and a connector detachably connected to a distal end of the seat to adapt to connect to a musical device;

a handle pivotally connected to the seat to force the spring to extend; and a securing device securely connected to a distal end of the spring and being movable relative to the inner tube to selectively clamp the notched post such that relative position of the inner tube to the outer tube is adjusted by the pivotal movement of the handle, wherein the seat has an opening, the inner tube has an operation hole aligned with the opening and the securing device has an actuating tube provided with a elongated hole aligned with the operation hole so that the handle is able to extend through the aligned opening, the operation hole and the elongated hole to control movement of the actuating tube.

11. The telescopic tube as claimed in claim 10, wherein the inner tube has a first pin hole and the seat has a second pin hole to align with a third pin hole in the handle, such that a first pin is able to extend through the aligned second pin hole and the third pin hole to allow the handle to pivot relative to the seat.

12. The telescopic tube as claimed in claim 11, wherein a second pin is securely received in the seat to connect to a first distal end of the spring and extend into the first pin hole so as to firmly position the inner tube in the seat.

13. The telescopic tube as claimed in claim 12, the securing device actuating tube which has a fourth pin hole to allow extension of a fourth pin which is movably received in the seat and in a slit in the handle thereby allowing the pivotal movement of the handle to drive the actuating tube to move.

14. The telescopic tube as claimed in claim 10, wherein the securing device actuating tube movably received in the inner tube, a retainer with a head securely received in a distal end of the inner tube and an inner sleeve movably mounted outside the inner tube and securely connected to the actuating tube.

15. The telescopic tube as claimed in claim 14, the inner tube has an elongated limiting hole and the actuating tube has a pin hole to allow a pair of pins to extend through the pin hole and into the limiting hole so that the pivotal movement of the handle is able to drive the inner sleeve to move relative to the inner tube.

16. The telescopic tube as claimed in claim 15, wherein the retainer further has a pair of clamping claws movable with respect to each other and each having therein a retaining bar such that the retaining bars of the pair of clamping claws are able to clamp the notched post when the clamping claws are moved toward each other.

17. The telescopic tube as claimed in claim 16, wherein the retainer is movable relative to the inner sleeve and the inner sleeve has a conical head formed inside the inner sleeve to selectively receive therein the pair of clamping claws so that when the pair of clamping claws are received in the conical head of the inner sleeve, the pair of clamping claws are forced to clamp the notched post and to secure a relative position of the inner tube to the outer tube.

18. The telescopic tube as claimed in claim 16, wherein the securing device further has two urging springs sandwiched between the pair of clamping claws to push the clamping claws away from each other.

* * * * *